(12) United States Patent
Shi

(10) Patent No.: US 9,326,490 B2
(45) Date of Patent: May 3, 2016

(54) TRACTION SWITCHING DEVICE

(71) Applicant: Fuyou Shi, Zhejiang Province (CN)

(72) Inventor: Fuyou Shi, Zhejiang Province (CN)

( * ) Notice: Subject to any disclaimer, the term of this patent is extended or adjusted under 35 U.S.C. 154(b) by 0 days.

(21) Appl. No.: 14/608,200

(22) Filed: Jan. 29, 2015

(65) Prior Publication Data

US 2016/0000044 A1 Jan. 7, 2016

(30) Foreign Application Priority Data

Jul. 4, 2014 (CN) ...................... 2014 2 0369616 U

(51) Int. Cl.
*B65H 75/30* (2006.01)
*A01K 27/00* (2006.01)

(52) U.S. Cl.
CPC .............. *A01K 27/004* (2013.01); *B65H 75/30* (2013.01)

(58) Field of Classification Search
CPC ............................... A01K 27/004; B65H 75/30
USPC ...................................................... 242/385.4
See application file for complete search history.

(56) References Cited

U.S. PATENT DOCUMENTS

| 4,856,726 A * | 8/1989 | Kang .................... A01K 27/004 242/384.7 |
| 5,377,626 A * | 1/1995 | Kilsby .................. A01K 27/004 119/796 |
| 6,148,773 A * | 11/2000 | Bogdahn ................ B65H 75/44 119/794 |
| 7,168,393 B2 * | 1/2007 | Bogdahn ............... A01K 27/004 119/796 |
| 8,826,864 B2 * | 9/2014 | Tang ..................... A01K 27/004 119/795 |
| 9,104,226 B2 * | 8/2015 | Shi ........................ A01K 27/004 |

\* cited by examiner

*Primary Examiner* — Sang Kim

(57) ABSTRACT

A traction switching device, comprising a push-pull button, a manual button, an upper casing, a pulley, a lower casing, a reset spring, wherein the lower casing is provided with a first slot; the push-pull button is imbedded in and sliding back and forth along the first slot; the manual button is sleeved on the hole corresponding to the push-pull button and simultaneously is installed at the position corresponding to the lower casing and the upper casing; the pulley is installed at the central axis of the lower casing; the reset spring is installed in the manual button. The traction switching device is featured with manual, flexible and easy operation, applicable to all domestic pets. By pulling the push-pull button while pressing the manual button, the traction switching device is fully locked; conversely, the traction switching device is unlocked by the push-pull button.

5 Claims, 3 Drawing Sheets

TRACTION SWITCHING DEVICE

BACKGROUND OF THE INVENTION

The utility model relates to traction devices, particularly relating to a traction switching device.

As more and more people love raising pets, tractions have been increasingly used and accepted. Different tractions are used in different places, thus a wide variety of tractions are required to meet the market demand. Pulley switch is one of the key devices for the traction, directly influencing its operation performance. The pulley switch is required to have dual braking function—interrupting and locking pulley rotation. Currently, the existing traction pulley braking switch is featured with complex and non-portable structure as well as inconvenient operation, which can not meet the existing market demand.

With application number of 201020231891.9, a dog leash pulley rotating and braking switching device, comprising a casing and a cover, wherein the casing is in-built with a pulley; characterized in that, the casing is provided with a switching button, a decorative piece and a locking piece; the switching button is sleeved on the hole corresponding to the decorative piece and is simultaneously installed at the position corresponding to the casing and cover; the limit lever on the switching button is installed in the sliding slot of the casing; the sliding slot on the decorative piece is stuck on the casing side wall; the post of the casing is sleeved on the limit hole corresponding to the locking piece; the locking piece is in-built with a switch spring; one end of the switch spring is sleeved on the locking piece and the other end is against the post of the casing. The technical proposal is characterized by complex structure and inconvenient operation, which can not meet the existing market demand.

BRIEF SUMMARY OF THE INVENTION

Aiming at the defects of prior art, the utility model provides a simple and reasonable traction switching device. By pulling the push-pull button while pressing the manual button, the traction switching device is fully locked; conversely, the traction switching device is unlocked by the push-pull button.

A traction switching device, comprising a manual button 2, an upper casing 3, a pulley 5, a lower casing 6 and a reset spring 8, wherein the manual button 2 is installed at the position corresponding to the lower casing 6 and the upper casing 3; the pulley 5 is installed at the central axis of the lower casing 6; the reset spring 8 is installed in the manual button 2; characterized in that, further comprising a push-pull button 1, wherein the manual button 2 is sleeved on the hole corresponding to push-pull button 1; the lower casing 6 is provided with a first slot 9; the push-pull button 1 is imbedded in the first slot 9.

Preferably, the manual button 2 is provided with a second slot 13.

Preferably, the push-pull button 1 is provided with a hook 12.

Preferably, the pulley 5 is provided with a pulley cover 4.

Preferably, the lower casing 6 is provided with an outlet 7.

Preferably, the lower casing 6 is provided with a lower casing post 11; one end of the reset spring 8 is fixed in the manual button 2 and the other end is against the lower casing post 11.

Preferably, the lower casing 6 is provided with a clamping point 10 next to the push-pull button 1.

The traction switching device is featured with manual, flexible and easy operation, applicable to all domestic pets. By pulling the push-pull button while pressing the manual button, the traction switching device is fully locked; conversely, the traction switching device is unlocked by the push-pull button. During operation, the reset spring is adopted for repeat operation.

DETAILED DESCRIPTION OF THE INVENTION

Figure 1:
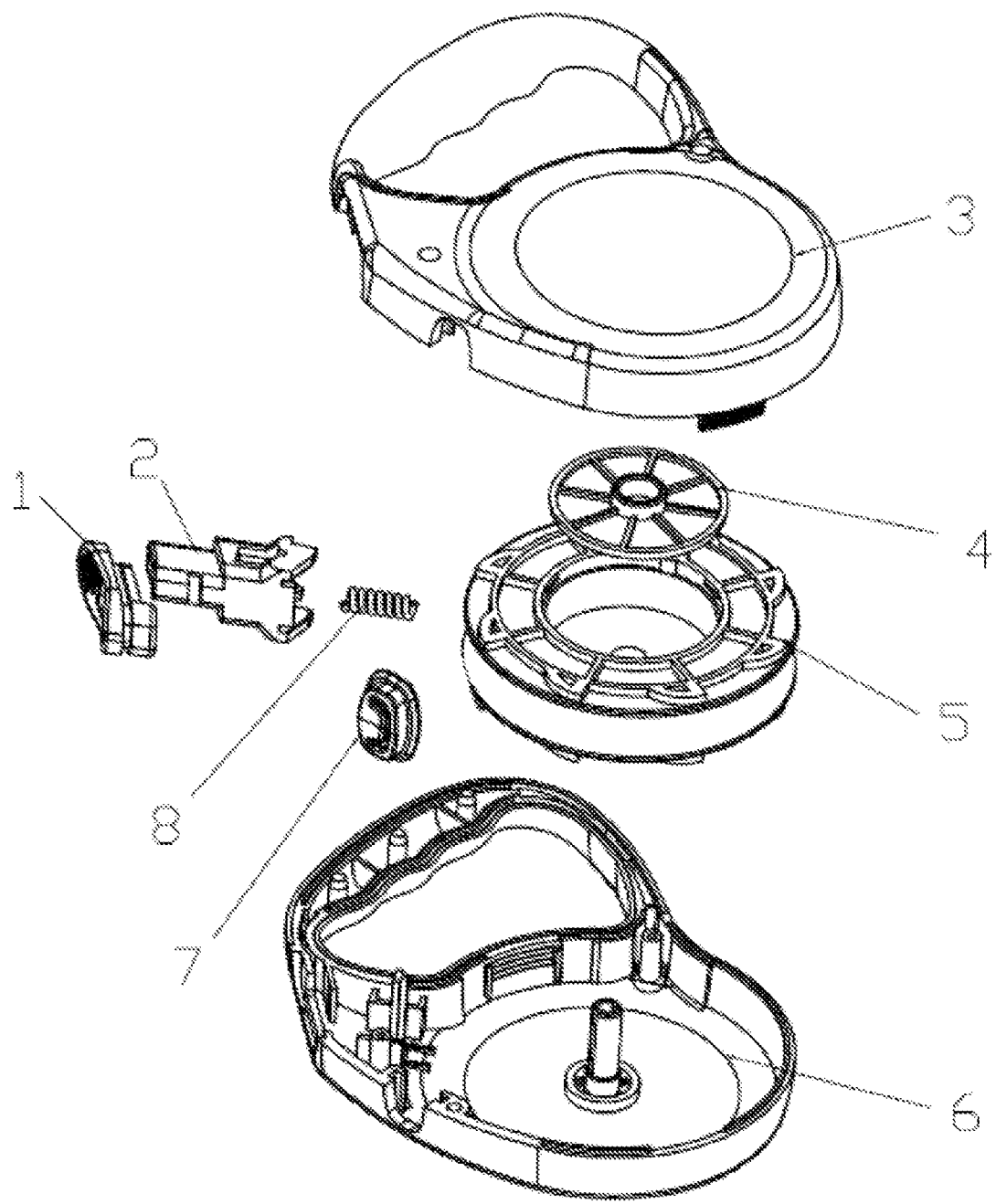
FIG. 1 depicts the 3D exploded view of traction switching device.
Figure 2:
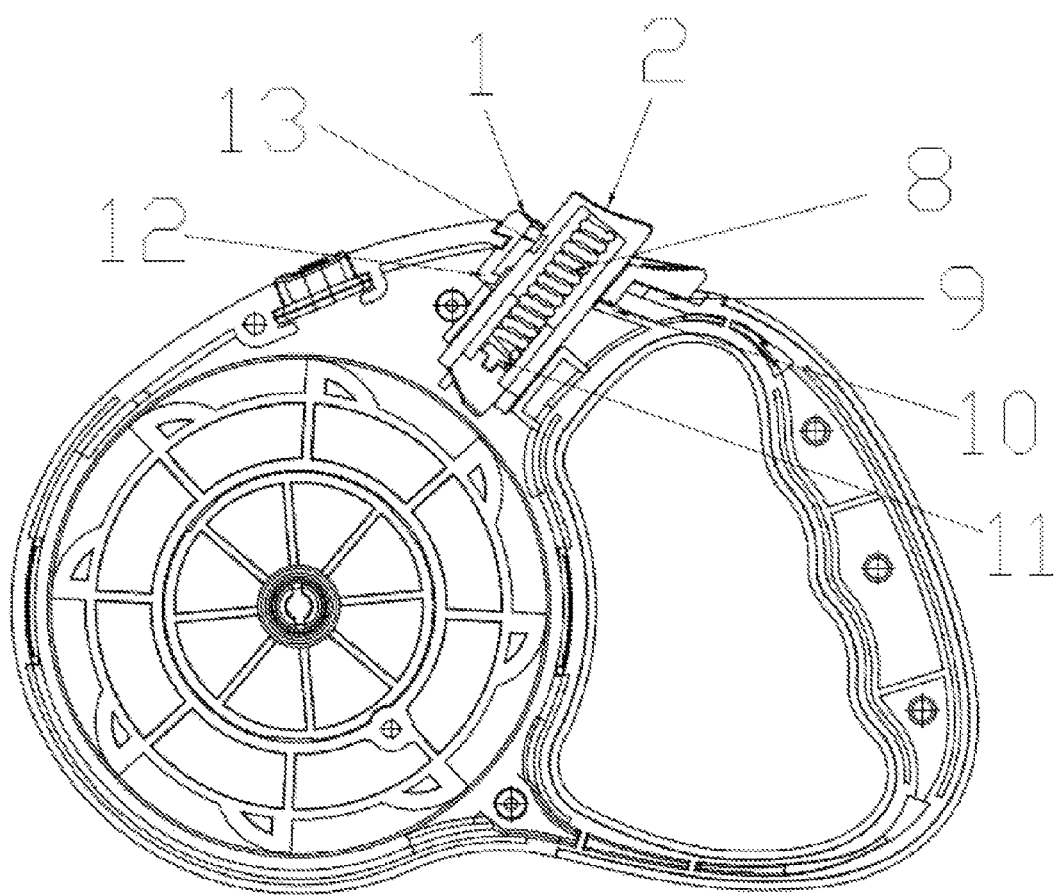
FIG. 2 depicts the structure diagram of combined traction switching device (no actions for switch)

As shown in FIG. 1 and FIG. 2, a traction switching device, comprising a push-pull button 1, a manual button 2, an upper casing 3, a pulley 5, a pulley cover 4, a lower casing 6 and a reset spring 8, wherein the lower casing 6 is provided with a first slot 9; the push-pull button 1 is imbedded in and sliding back and forth along the first slot 9; the manual button 2 is sleeved on the hole corresponding to the push-pull button 1 and simultaneously is installed at the position corresponding to the lower casing 6 and the upper casing 3; the push-pull button 1 is provided with a hook 12; the manual button 2 is provided with a second slot 13; the reset spring 8 is installed in the manual button 2; one end of the reset spring 8 is fixed on the manual button 2 and the other end is against the lower casing post 11 of the lower casing 6; the lower casing 6 is provided with a clamping point 10 next to the push-pull button 1, to prevent the push-pull button from vibration and looseness during push-pull process; the pulley 5 is provided with a pulley cover 4; the lower casing 6 is provided with an outlet 7; the pulley 5 is installed at the central axis of the lower casing 6.

Figure 3:
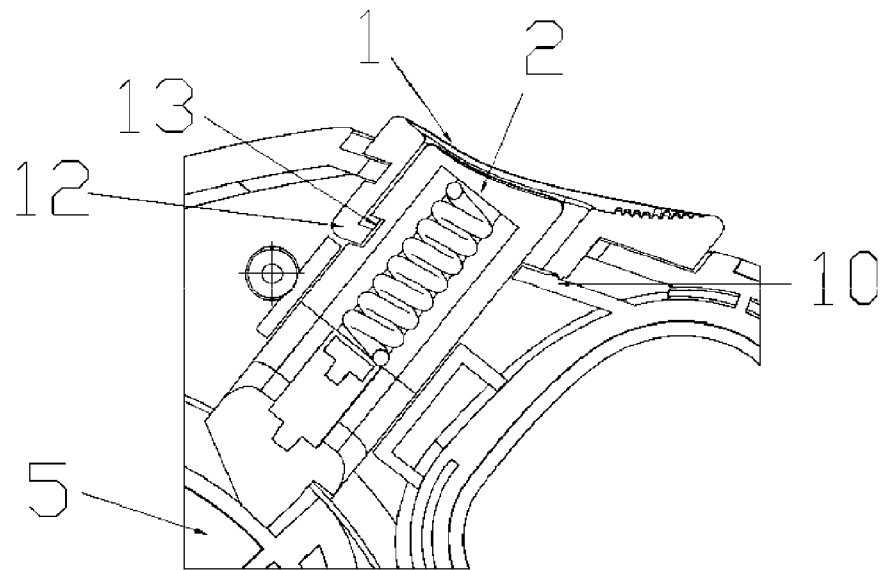
FIG. 3 depicts the schematic diagram of locked traction switching device.

FIG. 3 depicts the schematic diagram of locked traction switching device. Press the manual button 2 to lock the pulley and simultaneously pull the push-pull button 1 backward, to make the hook 12 of the push-pull button 1 stuck in the second slot 13 of the manual button 2. In case of full lock, it is impossible to recover the manual button 2.

Figure 4:
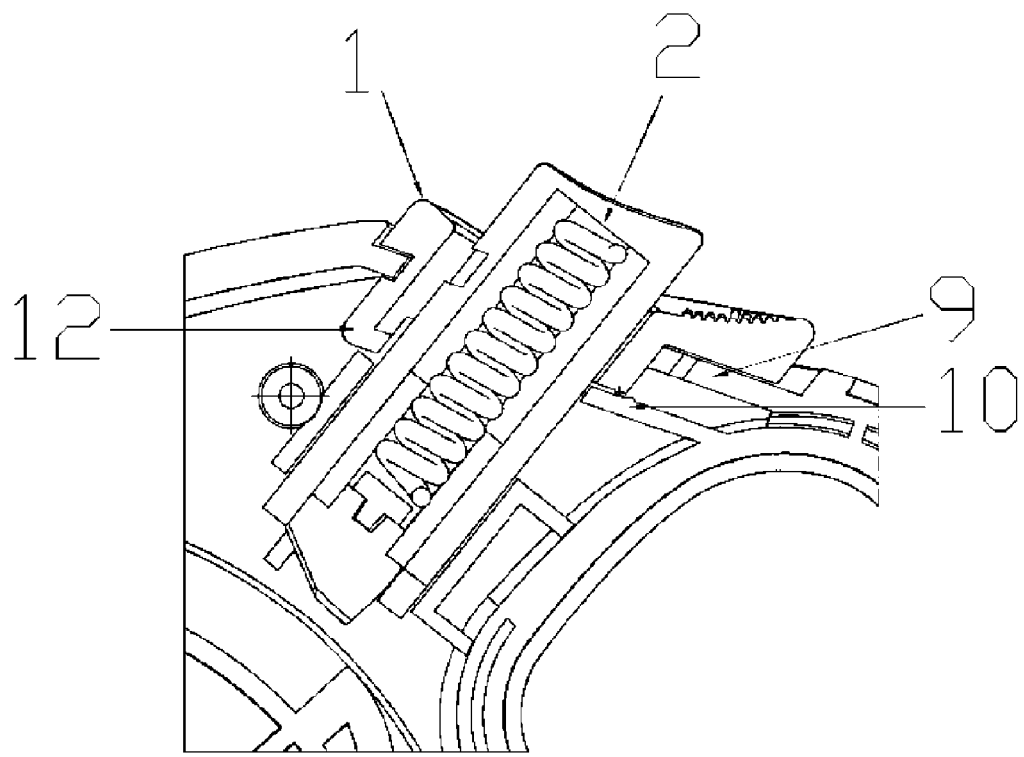
FIG. 4 depicts the schematic diagram of unlocked traction switching device.

FIG. 4 depicts the schematic diagram of unlocked traction switching device. When the push-pull button 1 slides forward, the hook 12 of the push-pull button 1 is released from the second slot 13 of the manual button 2 which returns to its original position under the action of reset spring 8, simultaneously the manual button 2 is inserted into one end of the locking plate of the pulley 5, to separate the locking plate of the pulley 5, then the manual button 2 returns to its original position, which achieves the locking function of the utility model.

Here the disclosed embodiments are exemplary in nature; it is only to the utility model explanation, and not to limit the utility model; the modifications and extensions foreseeable to technicians are included in the scope of utility model.

What is claimed is:

1. A traction switching device, comprising a manual button (2), an upper casing (3), a pulley (5), a lower casing (6), a reset spring (8), wherein the manual button (2) is installed at the position corresponding to the lower casing (6) and the upper casing (3); the pulley (5) is installed at the central axis of the lower casing (6); the reset spring (8) is installed in the manual button (2); further comprising a push-pull button (1), wherein the manual button (2) is sleeved on a hole corresponding to the push-pull button (1); the lower casing (6) is provided with a first slot (9); the push-pull button (1) is imbedded in the first slot (9); wherein the manual button (2) is provided with a second slot (13); the push-pull button (1) is provided with a hook (12); the hook (12) of the push-pull button (1) is stuck in the second slot (13) of the manual button (2) when pressing the manual button (2) to lock the pulley (5) and simultaneously pull the push-pull button (1) backward; the hook (12) of the push-pull button (1) is released from the second slot (13) of the manual button (2) when sliding forward the push-pull button (1).

2. The traction switching device described in claim 1, wherein the pulley (5) is provided with a pulley cover (4).

3. The traction switching device described in claim 1, wherein the lower casing (6) is provided with an outlet (7).

4. The traction switching device described in claim 1, wherein the tower casing (6) is provided with a lower casing post position (11); one end of the reset spring (8) is fixed in the manual button (2) and the other end is against the lower casing post position (11).

5. The traction switching device described in claim 1, wherein the lower casing (6) is provided with a clamping point (10) next to the push-pull button (1).

\* \* \* \* \*